US011773545B2

(12) United States Patent
Holmes et al.

(10) Patent No.: US 11,773,545 B2
(45) Date of Patent: Oct. 3, 2023

(54) RAPID CURE PAINT TECHNOLOGY

(71) Applicant: DAMAR INDUSTRIES LIMITED, Rotorua (NZ)

(72) Inventors: Victor Holmes, Auckland (NZ); Kishor Soma, Auckland (NZ)

(73) Assignee: Damar Industries Limited, Rotorua (NZ)

( * ) Notice: Subject to any disclaimer, the term of this patent is extended or adjusted under 35 U.S.C. 154(b) by 0 days.

(21) Appl. No.: 17/649,323

(22) Filed: Jan. 28, 2022

(65) Prior Publication Data

US 2022/0145555 A1     May 12, 2022

Related U.S. Application Data

(63) Continuation of application No. PCT/NZ2020/050080, filed on Jul. 30, 2020.

(30) Foreign Application Priority Data

Jul. 30, 2019    (NZ) ........................... 755899

(51) Int. Cl.
| | |
|---|---|
| *E01F 9/518* | (2016.01) |
| *E01F 9/524* | (2016.01) |
| *C09D 7/40* | (2018.01) |
| *B05B 7/14* | (2006.01) |
| *B05D 3/06* | (2006.01) |
| *C09D 5/33* | (2006.01) |
| *C09D 133/14* | (2006.01) |

(Continued)

(52) U.S. Cl.
CPC ............ *E01F 9/518* (2016.02); *B05B 7/1495* (2013.01); *B05D 3/067* (2013.01); *C09D 5/004* (2013.01); *C09D 7/69* (2018.01); *C09D 133/14* (2013.01); *E01C 23/14* (2013.01); *E01C 23/22* (2013.01); *E01F 9/524* (2016.02)

(58) Field of Classification Search
CPC ........ E01F 9/518; E01F 9/524; B05B 7/1495; B05D 3/067; C09D 5/004; C09D 7/69; C09D 133/14; C09D 7/63; C09D 133/04; E01C 23/14; E01C 23/22; C08K 5/37
See application file for complete search history.

(56) References Cited

U.S. PATENT DOCUMENTS

| | | | |
|---|---|---|---|
| 9,206,333 B2 | 12/2015 | Neugebauer et al. | |
| 2012/0269963 A1 | 10/2012 | Neugebauer et al. | |
| 2018/0170082 A1* | 6/2018 | Kim ..................... | B41J 11/0015 |

FOREIGN PATENT DOCUMENTS

| | | | | |
|---|---|---|---|---|
| CA | 2253054 A1 | | 5/1999 | |
| CA | 2812995 A1 * | | 3/2012 | ............. B05B 12/00 |
| CN | 105368281 A * | | 3/2016 | ............. C08K 13/04 |

(Continued)

OTHER PUBLICATIONS

Author Unknown; Quartz—Silica—Hosokawa Micron Powder Systems; Retrieved from: https://www.hmicronpowder.com/industry/mineral/quartz/[Jun. 24, 2022 1:14:37 PM] (Year: 2022).*

(Continued)

*Primary Examiner* — Nathan L Van Sell
(74) *Attorney, Agent, or Firm* — Dinsmore & Shohl LLP

(57) ABSTRACT

The present disclosure relates to a road marking paint composition for painting a coating a road substrate adapted for accelerated cure by exposure to UV light.

24 Claims, 1 Drawing Sheet

(51) Int. Cl.
*E01C 23/14* (2006.01)
*E01C 23/22* (2006.01)

(56) References Cited

FOREIGN PATENT DOCUMENTS

| | | | | |
|---|---|---|---|---|
| CN | 106752488 A | * | 5/2017 | ........... C09D 133/00 |
| EP | 2 792 723 B1 | | 1/2019 | |
| JP | 2001139643 A | * | 5/2001 | |

OTHER PUBLICATIONS

International Preliminary Report on Patentability for PCT Application No. PCT/NZ2020/050080, dated Aug. 31, 2021, 6 pages.

* cited by examiner

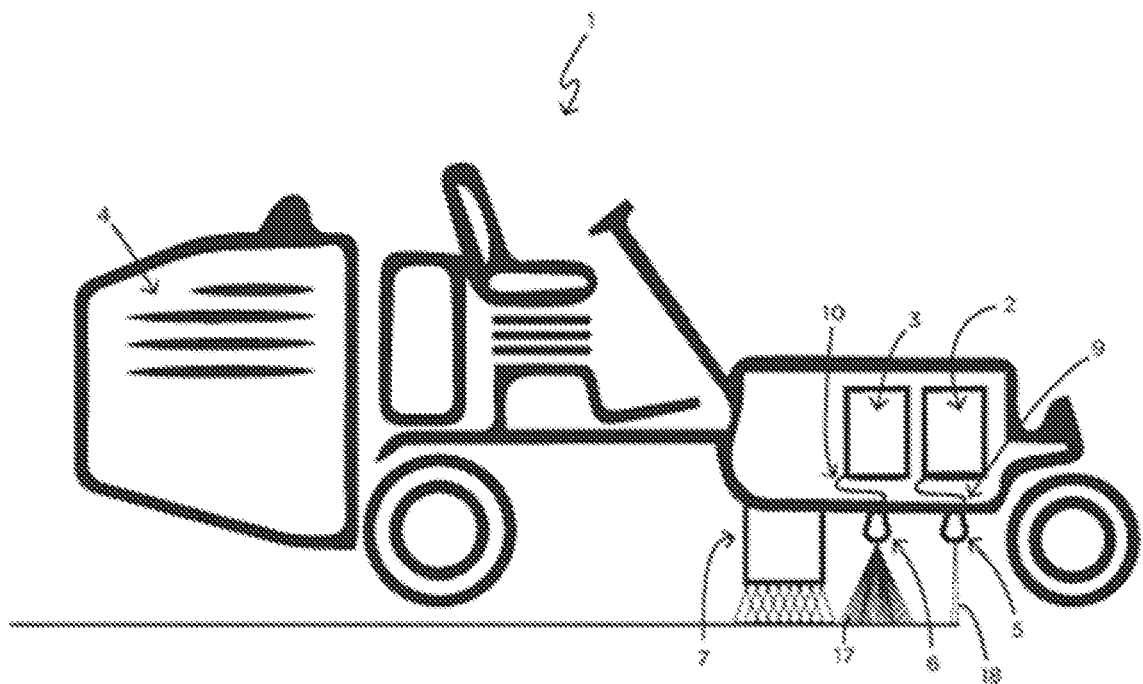

RAPID CURE PAINT TECHNOLOGY

CROSS-REFERENCE TO RELATED CASES

This Application is a bypass continuation of PCT International Application No. PCT/NZ2020/050080, filed Jul. 30, 2020, which claims priority to New Zealand (NZ) Application No. 755899, filed Jul. 30, 2019, the entire contents of each of which is incorporated herein by reference.

INTRODUCTION

Field of the Invention

The present disclosure relates a paint composition, additives and methods of application for high speed curing of a painted coating on a substrate, and in particular paint for road marking purposes.

Background to the Invention

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

In the road marking industry, it is commonplace for at least a portion of road to be closed to traffic while painted lines are applied. The road is closed so that the road marking equipment can be operated safely, the road marking workers can be separated from active traffic, and also so that painted lines can dry before being exposed to traffic. Some forms of paint used for the painted lines can require up to 24 hours to fully cure to a state where traffic can be endured. This means the road must be closed for a significant amount of time.

There have been some efforts made to reduce the time required for paint to dry and therefore the requirement for significant supporting closures. For example, U.S. Pat. No. 4,415,603 reports a paint which is able to be cured in a time of 10 to 30 seconds by exposure to a strong UV light source. However, the strength of the light source required has prevented commercial application of this technology.

Firstly, the power of the UV light source required to achieve the 10 to 30 second dry time can only be provided by a high power fusion or arc lamp. Such lamps are fundamentally fragile and require enormous amounts of power. In a road marking environment, this means a very large power generator must be incorporated onto the road marking vehicle. The electrical generators are costly to run, physically large and therefore difficult to incorporate onto road marking vehicles. Further, the fusion lamp must be positioned at about 50 mm (2") to the paint when applied to a road. Due to the fragility of the fusion lamp, they are easily broken by bumps in the road causing the road marking vehicle to strike the lamp on the road, breaking it, or even simply breaking due to movement while in use.

It is therefore an object of the present invention to improve upon the prior art, or at least provide the public with a useful choice.

SUMMARY

According to some broad embodiments the invention relates to a road marking paint composition for painting a coating of a thickness up to 400 um, when cured, on a road substrate adapted for accelerated cure by exposure to UV light, the composition comprising a paint formulation comprising: multifunctional acrylate oligomer in a concentration of between about 10 and 40% by weight; one or more of a multi and/or mono functional monomer of a concentration between about 15 and 50% by weight; a photoinitiator; thiol and/or mercaptan; and an acid functional acrylate; wherein the paint composition further comprises a first optically transmissive component, comprising a material adapted for substantial transparency to incident light of at least 365 to 405 nm mixed; and wherein the coating comprises a second optically transmissive component, comprising a material adapted for substantial transparency to incident light of at least 365 to 405 nm, the second optically transmissive component comprising a surface density of between about 500 and 700 g/m2. The road marking paint will typically also include one or more additives to impart color to the paint, such as pigments and/or fillers.

According to some broad embodiments the invention relates to a paint composition for painting a coating on a substrate adapted for accelerated cure by exposure to UV light, the composition comprising a paint formulation comprising: multifunctional acrylate oligomer in a concentration of between about 10 and 40% by weight; one or more of a multi and/or mono functional monomer of a concentration between about 15 and 50% by weight; a photoinitiator; thiol and/or mercaptan; and an acid functional acrylate.

In some embodiments, the paint composition further comprises a first optically transmissive component, comprising a particulate material adapted for substantial transparency to incident light of at least 365 to 405 nm.

In some embodiments, the first optically transmissive component comprises quartz, nepheline syenite and/or feldspar filler.

In some embodiments, the first optically transmissive component are from 1 to 70 microns diameter.

In some embodiments, the first optically transmissive component are up to 50 microns diameter.

In some embodiments, the first optically transmissive component is combined with the paint before painting the coating on the substrate.

In some embodiments, the paint composition further comprises a second optically transmissive component, comprising a material adapted for substantial transparency to incident light of at least 365 to 405 nm.

In some embodiments, the second optically transmissive component further comprises at least one or glass beads, angled glass and/or quartz agglomerates.

In some embodiments, the second optically transmissive component is generally spherical with an average diameter of from about 850 microns to about 1400 microns.

In some embodiments, the second optically transmissive component is adapted for combination with the paint formulation after application of the coating to the substrate.

In some embodiments, the second optically transmissive component is applied at a surface density of about 400 to 500 grams per square meter.

In some embodiments, the second optically transmissive component is applied at a surface density which substantially inhibits oxygen from contacting the coating.

In some embodiments, the acid functional acrylate is about 0.5 to 3% by weight.

In some embodiments, the paint formulation further comprises a heat stabilizer constituent.

In some embodiments, the heat stabilizer constituent comprises about 0.1 to 0.5% by weight.

In some embodiments, the paint formulation further comprises a wetting agent constituent.

In some embodiments, the wetting agent constituent comprises about 0.5 to 1% by weight.

In some embodiments, the paint formulation further comprises a waxes constituent.

In some embodiments, the waxes constituent comprises about 0.3 to 0.6% by weight.

In some embodiments, the paint formulation further comprises a matting agent or precipitated silica constituent.

In some embodiments, the matting agent or precipitated silica constituent comprises about 1 to 5% by weight.

In some embodiments, the paint formulation further comprises a modified clays constituent.

In some embodiments, the modified clays constituent comprises about 0.5 to 2% by weight.

In some embodiments, the paint formulation further comprises pigments and/or fillers adapted to color the paint formulation.

In some embodiments, the pigments and/or fillers comprise one or more of titanium dioxide and/or organic yellow and/or orange pigments.

In some embodiments, the titanium dioxide comprises about 5 to 13% by weight.

In some embodiments, the yellow and/or orange organic pigments comprises about 0.1 to 10%.

In some embodiments, the one or more multifunctional acrylate oligomer comprises one or more of epoxy acrylate, polyester acrylate and/or urethane acrylate.

In some embodiments, the multi and/or mono functional monomers comprises at least one of isobornyl acrylate, hexanedioldiacrylate, versatic acid, vinyl ester, lauryl acrylate, tetra hydroxy furfuryl acrylate and/or phenoxy ethyl acrylate.

In some embodiments, the photoinitiator comprises bisacylphosphine oxide.

In some embodiments, the bisacylphosphine oxide comprises about 1 to 4% by weight.

In some embodiments, the paint formulation further comprises a defoamer in a range of about 0.1 to 0.5% by weight.

In some embodiments, the thiol and/or mercaptan comprises about 1 to 4% by weight.

In some embodiments, the coating has a film thickness of up to about 400 micrometers when cured.

In some embodiments, the UV light has a wavelength in the range of about 365 to 405 nanometers.

In some embodiments, the UV light comprises by one or more LED components.

According to some broad embodiments the invention relates to a method of painting a coating on a substrate, comprising the steps of: spraying the paint formulation to form the coating on the substrate; then applying the second optically transmissive component to the coating, wherein the second optically transmissive component is applied at a surface density of between about 500 and 700 g/m2 such that the coating is substantially shielded from environmental air; then exposing the coating and applied second optically transmissive component to a UV light from a UV light source.

In some embodiments, the UV light has a wavelength in the range of about 365 to 405 nanometers.

In some embodiments, the UV light source comprises one or more LED components.

In some embodiments, the invention relates to any one or more of the above statements in combination with any one or more of any of the other statements. Other aspects of the invention may become apparent from the following description which is given by way of example only and with reference to the accompanying drawings.

The entire disclosures of all applications, patents and publications, cited above and below, if any, are hereby incorporated by reference. This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the views.

FIG. 1 is a side view of an exemplary ground surface marker.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Embodiments of the invention discussed herein relate to a paint composition which can be rapidly cured by a low power light source. In particular, cured by an LED light source which is comparatively low power compared to an arc or fusion light source. Compared to a fusion or arc light source, an LED light source has significant advantages in terms of manufacturing and operation costs, and an inherent robustness given their sold state nature. However, an LED light source has been historically unsuitable for paint curing in a road marking application because achieving the required optical power from an LED light source was not possible—only a fusion lamp could provide the optical power to dry paint in seconds.

Rather than rely on improvements in optical power which can be extracted from an LED light source or other adapted technology, the inventors have developed a paint composition which instead is operable for cure by an optical power in the range which can be provided by readily available LEDs.

The ability to use LEDs as a light source achieves commercial viability of a light-curable paint for road marking application. Firstly because the electrical power required to drive such an LED light is small and can easily be incorporated onto existing road marking equipment; and secondly, because LEDs are substantially more robust than a fusion lamp. Furthermore, an LED light source for the present application comprises a cluster of many individual LED sources. In cases where one or some LEDs are damaged in use, the cluster may be cheaply and easily repaired by replacing the individual components within a cluster, rather than the entire light source as would be the case for an arc or fusion lamp light source.

An LED light source, for example, generates about 1.2 to 1.8 W/cm2, whereas a Fusion or arc light source will generate around 2.5 to 3.0 W/cm2. However, the electrical power consumed by the LED light source is about 10% that of the fusion light source. Further, the lifespan of an arc or fusion light source is about 5000 hours per bulb. Comparatively, an LED light source has a lifespan closer to 25000 hours. Clearly then, a paint reactive to the power output of a LED based light source offers key advantages.

The paint composition of preferred embodiments is able to be fully cured in less than three seconds. In some cases, a road marking vehicle is able to cross a road, paint the required lines within the time required for a traffic light phase. This means that disruption to traffic is substantially avoided.

Practically, use of conventional road marking equipment has required a road or portion of a road to be closed to traffic—typically by arranging traffic cones and diverting traffic. Further, conventional road marking requires numerous support workers to manage traffic and traffic management devices, as well as the painting equipment and process itself. The deployment of workers to manage traffic and traffic cones, and the time required to paint a level 1 rural road intersection comprising of lead in line, limit line, arrow and symbol using convention paint would take around 100 minutes, including the time required for: 40 minutes to establish the site; 10 minutes to paint; 40 minutes to dry; 10 minutes to disestablish the site.

By way of comparison, the paint composition of the present invention can be applied at speeds of up to 20 km/h with substantially instant cure. Subsequently use of the present invention may not require any traffic diversion or road closure, and in some cases significantly reduces the need to numerous support workers. By way of comparison, to paint the same level 1 rural road intersection comprising of lead in line, limit line, arrow and symbol would take around 60 minutes, including the time for: 40 minutes establishment of site; 10 minutes to paint; up to 3 seconds drying time; disestablishment of site 10 minutes. This is a total saving of 40 minutes per intersection.

According to a first exemplary embodiment, there is paint composition for painting a coating on a substrate and the paint composition is adapted for accelerated cure by exposure to UV light. The composition comprises a paint formulation which is enhanced by combination with one or more types of optical components. The paint composition includes at least: multifunctional acrylate oligomer; one or more of a multi and/or mono functional monomer; a photoinitiator; thiol and/or mercaptan; and an acid functional acrylate.

In exemplary embodiments, the multifunctional acrylate oligomer has a concentration of between about 10 and 40% by weight. However, in alternative embodiments, the concentration may be one of about 9 to 39%; 10 to 38%; 11 to 37%; 12 to 36%; 13 to 37%; 14 to 38%; 15 to 37%; 16 to 36%; 17 to 35%; 18 to 34%; 19 to 33%; 20 to 32%; 21 to 31%; 22 to 30%; 23 to 29%; 24 to 28%; or 25 to 27%.

The one or more multifunctional acrylate oligomer is selected from a group of one or more of epoxy acrylate, polyester acrylate and/or urethane acrylate. The desired form of paint application is to spray to a surface. Therefore, the concentration of the multifunctional acrylate oligomer may be varied to optimize the spray-ability of the paint depending on viscosity and ability to reduce to spray-able consistency.

In exemplary embodiments, the one or more multi and/or mono functional monomer is selected from a group including isobornyl acrylate, hexanedioldiacrylate, versatic acid, vinyl ester, lauryl acrylate, tetra hydroxy furfuryl acrylate and/or phenoxy ethyl acrylate. A selection may be made based on good diluting power, weather-ability, hydrolytic stability, adhesion to glass and mineral substrates. In exemplary embodiments, the multi and/or mono functional monomer is utilized to dilute to application viscosity whilst maintaining the 100% solids status.

In one exemplary embodiment, the one or more multi and/or mono functional monomer includes a combination of epoxy acrylate at a concentration of about 10 to 20% by weight for efficient cure and toughness; polyvinyl chloride of about 2 to 10% by weight for adhesion and flexibility, isobornyl acrylate of about 15 to 30% by weight for spray-ability and adhesion, hexanedioldiacrylate of about 4 to 10% by weight for cure efficiency, versatic acid vinyl ester of about 1 to 7% by weight for matting orientation, weather-ability and hydrolytic stability, and acid functional acrylate of about 0.5 to 3% by weight for glass bead reception and adhesion to bitumen and chip thereby avoiding the need for a primer (except for applications on to some problematic substrates such as concrete substrates).

The particular combination of multi and/or mono functional monomers may be adjusted according to the desired properties of the paint. For example, increasing the concentration of a particular multi and/or mono functional monomer will offer improvements in the paint characteristics provided and adjustment may be required depending on, for example, the characteristics of the surface material being painted. Generally, epoxy acrylate affects efficient cure and toughness; polyvinyl chloride affects adhesion and flexibility, isobornyl acrylate affects spray-ability and adhesion, hexanedioldiacrylate of affects cure efficiency, versatic acid vinyl ester affects matting orientation, weatherability and hydrolytic stability, and acid functional acrylate affects glass bead reception and adhesion.

In preferred embodiments, the multi and/or mono functional monomer has a concentration of about 15 to 50% by weight. However, in alternative embodiments, the concentration may be one of about 16 to 49%; 17 to 48%; 18 to 47%; 19 to 46%; 20 to 45%; 21 to 46%; 22 to 47%; 23 to 46%; 24 to 45%; 25 to 44%; 26 to 43%; 27 to 42%; 28 to 41%; 29 to 40%; 30 to 39%; 31 to 38%; 32 to 37%; 33 to 36%; or 34 to 35% by weight.

In exemplary embodiments, the photoinitiator comprises bisacylphosphine oxide which has good reception of 365-405 nanometer light. The bisacylphosphine oxide comprises about 1 to 4% by weight. However, in alternative embodiments, the concentration may be between about 1.5 to 3.5; 2 to 3; or about 2.5% by weight.

In exemplary embodiments, the thiol and/or mercaptan comprises about 1 to 4% by weight. However, in alternative embodiments, the concentration may be between about 1.5 to 3.5; 2 to 3; or about 2.5% by weight. Further, the thiol and/or mercaptan offers an advantage of improving the adhesion of the paint to glass beads which may be incorporated into the paint and/or added to applied paint before the paint is cured.

While the above constituents form the fundamental constituents of the paint, further constituents may be added to the paint for practical purposes. For example, one or more of a heat stabilizer constituent, wetting agent, waxes, a matting agent, modified clays and/or a defoamer may be added to enhance practical circumstances such as spray-ability, stability of the paint mixture during storage, suitability for use with certain types of spray pumps and the like.

In exemplary applications, the paint is sprayed onto a surface in use, and a pump is used to pressurize the paint for spraying. Pumps for paint spraying applications typically generate heat which is transferred to the paint. To prevent the paint curing or partially curing in the pump or surrounding heated areas, a heat stabilizer constituent is added to the paint formulation. In exemplary embodiments, the heat stabilizer constituent is added in a range of about 0.1 to 0.5% by weight. However, in alternative embodiments, the concentration may be between about 0.2 and 0.4%, or about 0.3% by weight.

To further aid suitability for use with pumps which generate significant heat in use, in some embodiments, the paint formulation further comprises of waxes constituent which act to lubricate the pump. In some embodiments, the waxes constituent comprises about 0.3 to 0.6% by weight. However, in alternative embodiments, the concentration may be about 0.4 to 0.5% or 0.45% by weight.

The acid functional acrylate functions as a cure stabilizer to keep the formulation stable in storage by maintaining a low pH which assists with shelf life extension.

In some exemplary embodiments the paint formulation further includes a matting agent or precipitated silica constituent. In some embodiments, the matting agent or precipitated silica constituent comprises about 1 to 5% by weight. However, in alternative embodiments, the concentration may be between about 1.5 to 3.5; 2 to 3; or about 2.5% by weight. A matting agent may be added to control the gloss or surface smoothness of the paint when applied.

In some exemplary embodiments the paint formulation further includes a modified clays constituent to control antisettle behavior. In some embodiments, the modified clays constituent may be between about 0.5 to 2% by weight. However, in alternative embodiments, the concentration may be between about 1 to 1.5; or about 1.25% by weight.

In some exemplary embodiments the paint formulation further includes a defoamer in a range of about 0.1 to 0.5% by weight. However, in alternative embodiments, the concentration may be between about 0.2 to 0.4; or 0.3% by weight.

Many commercial applications of the above described paint formulation require that the paint be a defined color. For example, in a road environment, white, yellow and orange colors are most desired. Therefore, in some exemplary embodiments, the paint formulation further includes pigments and/or fillers adapted to color the paint formulation.

For example, the paint formulation may have added the pigments and/or fillers such as one or more of titanium dioxide and/or organic yellow and/or orange pigments so that a desired paint color is produced. Pigments and fillers are selected for white formulations (Titanium Dioxide) and other colors such as yellow (organic yellow and orange pigments) to maximize color but minimize absorbance of UV light.

For a white paint, exemplary embodiments of the paint include titanium dioxide at a concentration of between about 5 and 13% by weight. For a yellow or orange paint, exemplary embodiments include yellow and/or orange organic pigments of between about 0.1 and 10% by weight. Many other colors are achievable by the use of suitable pigments known to control paint colors as are understood by those skilled in the art.

In some embodiments of the paint used for common road marking applications, optically transmissive filter particles are included in the paint composition to provide particular advantages. Exemplary forms of the filler is an optically transmissive particle selected from a group of one or more of Feldspar, quartz, crushed glass, nepheline syenite, and/or mica. However, other materials offering transparency in at least the 365 to 405 nm region of the optical spectrum may be possible.

One particular advantage of the exemplary fillers added to the composition is to improve UV light penetration ability. The aforementioned fillers improve the curing process by spacing of the color pigments and not reacting with the acid functional additives. Further, the distribution of optically transmissive filler within the paint composition provides for an optical pathway for UV rays incident a sprayed coating. The optical pathway through the depth of the painted coating therefore allows for a thicker than conventional UV-cured coating to be sprayed and successfully cured in a matter of seconds.

A thicker painted coating is often desirable to provide a longer duration between repainting intervals A conventional UV cured painted coating may have its painted coating thickness limited by the UV light penetration depth, which may be as little as 100 microns. Current waterborne products need to be applied at around 550 um wet film to achieve an about 300 um dry film painted coating thickness. However, such a thickness takes several hours to dry and involves significant traffic management costs. Further, the long dry time is susceptible to weather disruptions—if the painted were to be rained on within hours after application, the paint may be ruined and have to be reapplied. However, in addition to the almost instant cure time, the paint of the present invention is able to be painted with a cured coating thickness of up to 400 microns is achievable as facilitated by the light paths formed by the filler.

To further optimize the advantages of the filler, the filler particle components are generally angular with an average particle size which may range from about 1 to 70 microns. The filler is ideally added to the paint composition during manufacture, or at least before the paint is sprayed. In this way, the filler is interspersed within the paint with a substantially even distribution. In exemplary embodiments, the filler is 25 to 38% by weight and is best used with precipitated silica and the aforementioned modified clays to reduce settling on storage.

In further exemplary embodiments, a second optically transmissive component is added to the paint composition. However, the second component is added to the surface of the paint after application by spraying. For example, the second optically transmissive component is sprayed over a freshly sprayed paint, then the combination is subject to UV light for curing.

Again, the second optically transmissive component is a material adapted for substantial transparency to incident light of at least 365 to 405 nm and may be selected from a group of one or more of glass beads, angled glass and/or quartz agglomerates.

In some embodiments, the second optically transmissive component is generally spherical with an average diameter of from about 100 to 850 microns and/or 850 to 1400 microns.

The second optically transmissive components performs several tasks—first is to substantially inhibit oxygen from the painted coating on the substrate which may otherwise cause slowing of the UV cure process. For this task, the second optically transmissive component is ideally applied at a surface density of at least about 300 grams per square meter, and optimally between about 400 and 500 grams per square meter.

A further task of the second optically transmissive component is to provide retroreflective properties: In a road marking application, it is desirable for painted lines to be at least somewhat retroreflective such that the lines a highly visible to oncoming traffic. To achieve good retroreflective properties, the second optically transmissive component is ideally applied at a surface density of at least about 300 grams per square meter, and optimally between about 400 and 500 grams per square meter.

A further task of the second optically transmissive component is to facilitate light penetration into a painted coating and to couple light into the first optically transmissive components which are interspersed within the coating. Again, the second optically transmissive component is ideally applied at a surface density of at least about 300 grams per square meter, and optimally between about 400 and 700 grams per square meter.

In some exemplary embodiments, the second optically transmissive component are glass beads, such as glass beads selected from a group including one or more of Type A, B, C or D glass beads. Other retroreflective composites may also be used where substantially similar functionally equivalent optical properties are exhibited. In some embodiments, any Type of glass bead and/or composite may be combined to provide the second optically transmissive components applied as a surface layer to a painted coating on a substrate.

To optimize the advantages of the second optically transmissive components, a surface density of 400 to 500 grams per square meter is used for a painted coating thickness of about 150 to 250 microns. Or, a surface density of 500 to 700 grams per square meter is used for a painted coating thickness of about 250 to 400 microns. In some embodiments, a mix of type B and type D glass beads is used.

To further optimize the paint composition, including the first and or second optically transmissive components, the paint formulation further comprises a wetting agent constituent to adjust surface energy and ensure slight wrap-around, or wicking, of glass beads on the coating surface. The wicking acts to mechanically fasten the beads into the paint by extending more than halfway about the periphery of the bead while adequate surface area of the bead remains exposed such that retroreflective characteristics are not substantially impacted. Further, the wicking enhances skid resistance of the painted coating. Furthermore, the wicking effect allows for substantially higher wear resistance caused by the enhanced mechanical stability of the beads. In some exemplary embodiments, the wetting agent constituent is about 0.5 to 1% by weight.

During manufacture, pigments and fillers are dispersed in the monomer and oligomer at high tip speed on dispersers until temperature reaches about 40 degrees Celsius, then monomers are added to cool before adding heat sensitive components. The paint is packed off into polyethylene/polypropylene containers or epoxy lined drums and pails labelled with class 9 labels and skin irritant insignia.

Therefore, exemplary embodiments of the invention which have been described is a paint which is able to be sprayed but highly thixotropic virtually 100% solids (UV convertible) liquid designed to coat various road surfaces without running off peaks of aggregate in the wet state before receiving retro-reflective glass beads and substantially immediate cure. For practical application, operators will set paint spraying equipment to evenly distribute 180-250 micron layers of paint and run application machines at pre-set speeds depending on the number of UV lamps employed to ensure good through cure after bead application.

Cures time of 1.5 seconds at a dry coating thickness of 300 um have been demonstrated, when combined with a mixture of Type B and D glass beads as a surface layer.

The need for an adhesion primer to be applied to a road surface before application of the paint is avoided, meaning single coat of paint can be sprayed paint coat except for the aforementioned concrete substances.

Methods of painting a road making use of the paint composition of the above described embodiments typically include the steps of spraying the paint to form a painted coating on the road. The spray equipment may be airless or may be designed to optimize sprayability of the paint such by application of a pump suitable for spraying paint containing the first optically transmissive components.

Once the paint is applied to the road surface substrate, the second optically transmissive component is applied to the surface of the painted coating. The second optically transmissive component is preferably applied at a surface density of between about 500 and 700 g/m2 such that the coating is substantially shielded from environmental air. Practically, road marking equipment will have two spray guns in proximate locale, a first spray gun for applying the paint and combined first optically transmissive components to the road, and a second bead spray gun for spraying the second optically transmissive components to follow the surface of the painted substrate.

Subsequently, the painted substrate and coating with the surface layer of second optically transmissive components are exposed to UV light for accelerated curing. As mentioned, the UV light source can be a LED based light source for efficient use of available electrical power and environmental robustness.

An example of a ground surface marker vehicle, such as a road marking vehicle is shown in FIG. 1. Other details of marker apparatus are described in New Zealand patent 743780, the contents of which are incorporated by reference. In particular, FIG. 1 shows an exemplary arrangement and alignment of a paint spraying nozzle, a glass bead spraying nozzle and UV light source are shown. The vehicle 1 has a paint tank 2, a bead container 3, a pump (not shown), a generator 4, a paint applicator, for example a spray gun 5, a bead applicator, for example a bead dispenser 6, and a UV light module 7. The marking vehicle 1 is typically used to apply paint to a road to either create new road markings or to repaint existing road markings that are fading. The marking vehicle 1 may also be used for surfaces in off-road situations, for example for applying markings in car parks, schools, shopping centers factories, and warehouses. In use, the container 3 is filled with beads and the tank 2 is filled with paint.

A paint hose 9 connects the paint tank 2 to the spray gun 5. The hose 9 is preferably high pressure, polytetrafluoroethylene ("PTFE")/Teflon™-lined, and light-shielded. A suitable pump is a low shear, high pressure pump capable of delivering paint from the tank 2 to the spray gun 5 within a range of 1-3000 pounds per square inch ("PSI"). The paint spray gun 5 is preferably an automatic, airless spray gun with PTFE/Teflon™ low sheer seals. However other types of spray gun are also suitable, for example an air pressurized spray gun. The pump is able to deliver paint from the tank 2 to and from the spray gun 5. A bead hose 10 connects the bead container 3 to the dispenser 6. The container 3 is filled with reflectors in the form of beads such as conventional glass beads. The beads can be fed to the dispenser 6 by a pressure feeder (not shown). Alternatively, the beads can be moved to the dispenser 6 under gravity.

The UV light module 7 comprises a housing which preferably contains an LED UV light which is in turn powered, for example, by the generator 4. The UV light source is ideally surrounded by a light blocking device such as fringe of coarse bristles 13. The bristles 13 may be similar to those used in commercial and automotive dust, spray and light barriers.

In the preferred embodiment, to apply or to reapply road markings the marking vehicle 1 is driven by the operator to the correct position on the road. The operator determines the correct position by aligning the marking vehicle 1 as described above.

The operator drives forward and activates the pump, spray gun 5, bead dispenser 6 and the generator 4 to power the UV light module 7. The pump feeds paint to the spray gun 5 which applies paint to the road. The dry film thickness may be adjusted by the size of the spray tip and by the speed that the paint is applied. At the same time beads are fed to the dispenser 6, which is positioned behind the spray gun 5, and the beads are sprayed onto the road and are fully or partially embedded into wet paint as the marker 1 moves forward. The UV light module 7, 11 powered by the generator 4, then passes over the bead-embedded paint and causes drying of the paint with embedded beads normally within about 0.5 to 1.5 seconds.

Alternatively, there are two bead containers feeding beads of alternative sizes to two corresponding bead dispensers. The two bead dispensers 6 are mounted one behind the other, dispensing larger beads (for example, Type D beads) first followed by smaller beads (for example, Type B beads) after which the UV light causes drying of the paint with embedded beads of different sizes.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form.

For example, while only some aspects of the invention may currently be recited as being embodied in a computer-readable medium, other aspects may likewise be so embodied.

What is claimed is:

1. A road marking composition for application of a coating up to 400 um thickness on a substrate, the road marking composition comprising a paint formulation adapted for cure by exposure to UV light and spray application, and a surface coating adapted for partial cover of the paint formulation, the paint formulation comprising:
    multifunctional acrylate oligomer comprising one or more of epoxy acrylate, polyester acrylate, and/or urethane acrylate having a concentration of between about 10 and 40% by weight;
    one or more of a multi and/or mono functional acrylate monomer comprising at least one of isobornyl acrylate, hexanedioldiacrylate, versatic acid, vinyl ester, lauryl acrylate, tetra hydroxy furfuryl acrylate and/or phenoxy ethyl acrylate having a concentration between about 15 and 50% by weight;
    a photoinitiator comprises bisacylphosphine oxide of about 1 to 4% by weight;
    thiol and/or mercaptan of about 1 to 4% by weight;
    an acid functional acrylate of about 0.5 to 3% by weight; and
    a first optically transmissive component, comprising quartz, nepheline syenite and/or feldspar filler having substantial transparency to incident light of at least 365 to 405 nm,
    wherein the surface coating comprises a second optically transmissive component, comprising glass beads, angled glass and/or quartz agglomerates having substantial transparency to incident light of at least 365 to 405 nm.

2. The road marking composition of claim 1, wherein the first optically transmissive component is from 1 to 70 microns diameter.

3. The road marking composition of claim 1, wherein the first optically transmissive component is up to 50 microns diameter.

4. The road marking composition of claim 1, wherein the second optically transmissive component is generally spherical with an average diameter of from about 850 microns to about 1400 microns.

5. The road marking composition of claim 1, wherein the paint formulation further comprises a heat stabiliser constituent.

6. The road marking composition of claim 5, wherein the heat stabiliser constituent comprises about 0.1 to 0.5% by weight.

7. The road marking composition of claim 1, wherein the paint formulation further comprises a wetting agent constituent.

8. The road marking composition of claim 7, wherein the wetting agent constituent comprises about 0.5 to 1% by weight.

9. The road marking composition of claim 1, wherein the paint formulation further comprises a waxes constituent.

10. The road marking composition of claim 9, wherein the waxes constituent comprises about 0.3 to 0.6% by weight.

11. The road marking composition of claim 1, wherein the paint formulation further comprises a matting agent or precipitated silica constituent.

12. The road marking composition of claim 11, wherein the matting agent or precipitated silica constituent comprises about 1 to 5% by weight.

13. The road marking composition of claim 1, wherein the paint formulation further comprises a modified clays constituent.

14. The road marking composition of claim 13, wherein the modified clays constituent comprises about 0.5 to 2% by weight.

15. The road marking composition of claim 1, wherein the paint formulation further comprises pigments and/or fillers adapted to colour the paint formulation.

16. The road marking composition of claim 15, wherein the pigments and/or fillers comprise one or more of titanium dioxide and/or organic yellow and/or orange pigments.

17. The road marking composition of claim 16, wherein the titanium dioxide comprises about 5 to 13% by weight.

18. The road marking composition of claim 16, wherein the yellow and/or orange organic pigments comprises about 0.1 to 10%.

19. The road marking composition of claim 1, wherein the paint formulation further comprises a defoamer in a range of about 0.1 to 0.5% by weight.

20. The road marking composition of claim 1, wherein the UV light has a wavelength in a range of about 365 to 405 nanometres.

21. The road marking composition of claim 1, wherein the UV light comprises by one or more LED components.

22. A substrate to which the road marking composition of claim 1 has been applied, wherein the second optically transmissive component has been applied at a surface density of about 400 to 500 grams per square metre.

23. A substrate to which the composition of claim 1 has been applied, wherein the second optically transmissive component has been applied at a surface density which substantially inhibits oxygen from contacting the coating.

24. A road marking system comprising an LED UV light source of between 1.2 to 1.8 W/cm2 and a road marking composition for application of a coating up to 400 um thickness on a substrate, the composition comprising a paint formulation adapted for cure by exposure to UV light and spray application, and a surface coating adapted for partial cover of the paint formulation the paint formulation comprising:

multifunctional acrylate oligomer comprising one or more of epoxy acrylate, polyester acrylate, and/or urethane acrylate having a concentration of between about 10 and 40% by weight;

one or more of a multi and/or mono functional acrylate monomer comprising at least one of isobornyl acrylate, hexanedioldiacrylate, versatic acid, vinyl ester, lauryl acrylate, tetra hydroxy furfuryl acrylate and/or phenoxy ethyl acrylate having a concentration between about 15 and 50% by weight;

a photoinitiator comprises bisacylphosphine oxide of about 1 to 4% by weight;

thiol and/or mercaptan of about 1 to 4% by weight;

an acid functional acrylate of about 0.5 to 3% by weight; and a first optically transmissive component, comprising quartz, nepheline syenite and/or feldspar filler having substantial transparency to incident light of at least 365 to 405 nm, wherein the surface coating comprises a second optically transmissive component, comprising glass beads, angled glass and/or quartz agglomerates having substantial transparency to incident light of at least 365 to 405 nm, and wherein the LED UV light source is adapted to cure the road marking composition when sprayed on the substrate.

* * * * *